United States Patent [19]
Feterl

[11] 3,782,333
[45] Jan. 1, 1974

[54] LIVESTOCK FEEDER

[76] Inventor: Leon G. Feterl, Salem, S. Dak. 29676

[22] Filed: Dec. 23, 1971

[21] Appl. No.: 211,293

[52] U.S. Cl. .............................. 119/52 R, 119/58
[51] Int. Cl. ........................................... A01k 05/00
[58] Field of Search ................. 119/52 R, 53, 53.5, 119/58

[56] References Cited
UNITED STATES PATENTS

| | | | |
|---|---|---|---|
| 1,361,660 | 12/1920 | Adix et al. | 119/53 X |
| 2,827,876 | 3/1958 | Trobaugh | 119/52 R |
| 1,335,155 | 3/1920 | Brown | 119/53 |
| 2,290,042 | 7/1942 | Granville | 119/52 R |

Primary Examiner—Hugh R. Chamblee
Attorney—George F. Williamson et al.

[57] ABSTRACT

A wagon feeder for livestock having feed troughs extending along both sides thereof, with the feed troughs being divided by upright plates into horizontally spaced feed compartments which communicate with flat feed accumulating and feeding floor segments interiorly of the feeder through open bottom portions of upright side walls of the feeder. The open portions of the feeder side walls are divided into a plurality of livestock feeding spaces within each of the feeding compartments by upright bars.

4 Claims, 3 Drawing Figures

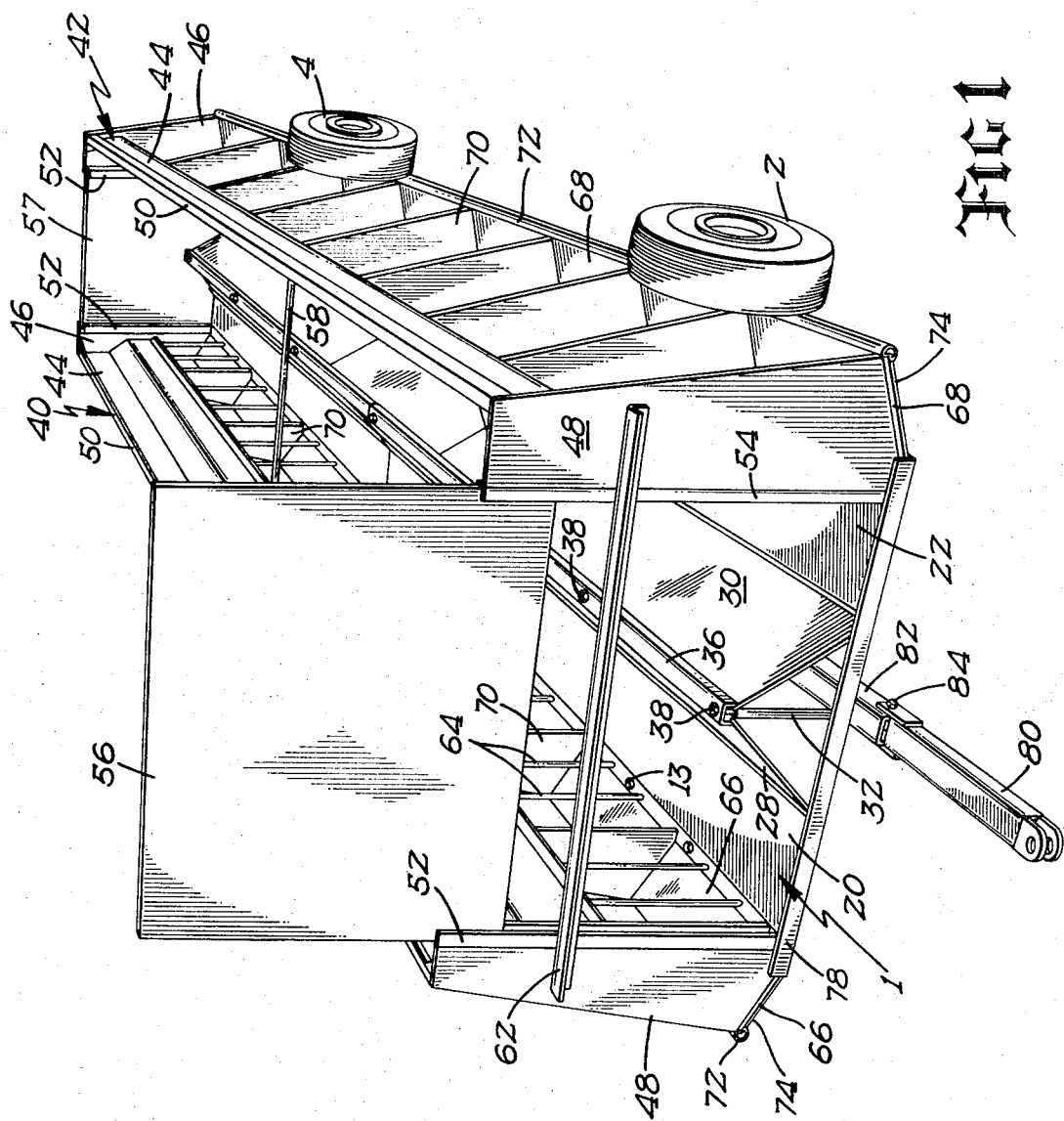

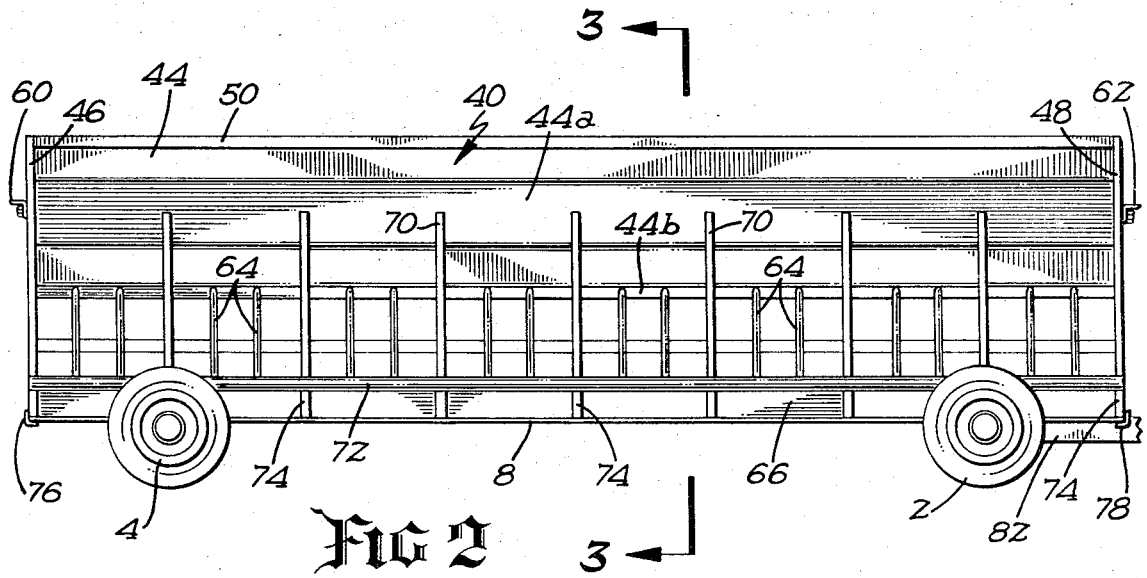
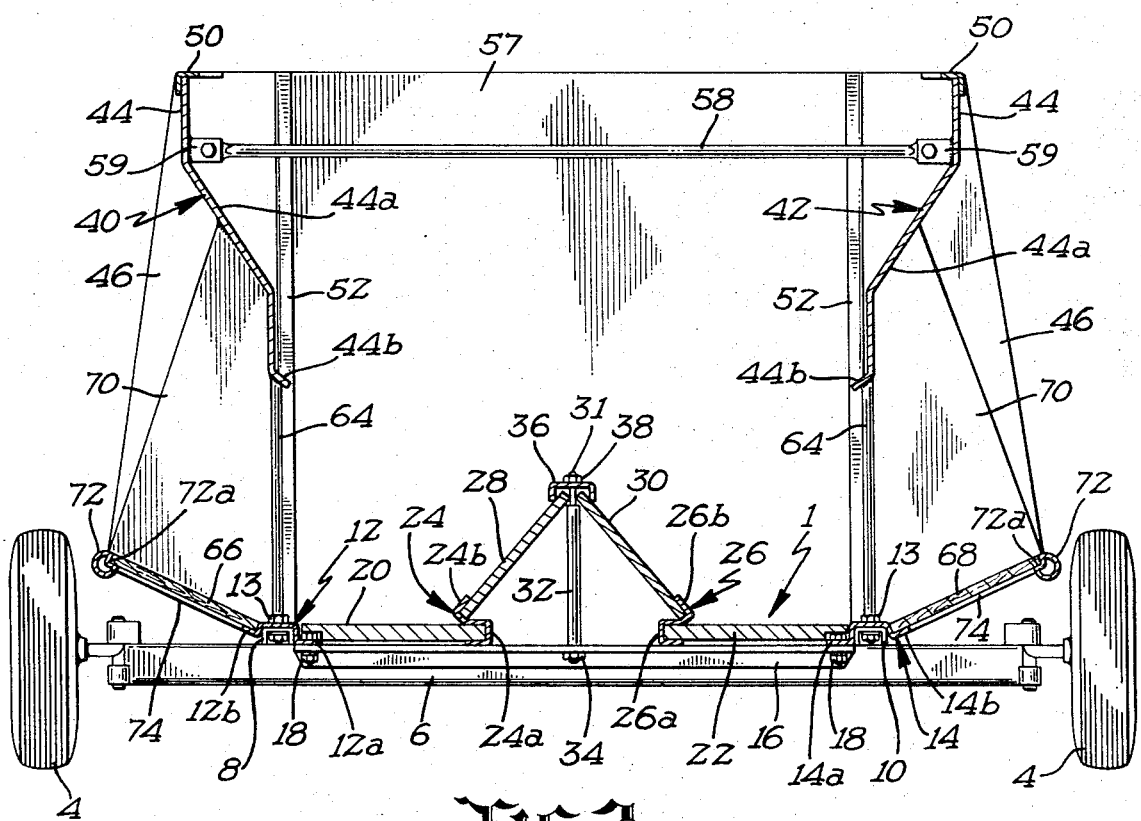

LIVESTOCK FEEDER

BRIEF SUMMARY OF THE INVENTION

This invention is directed to a livestock feeder pariturclarly characterized by an easily assembled feed storage floor, side wall and guide baffle structure which provide a large number of readily accessible, separated feeding zones for livestock from a combination of side feed troughs and floor feed areas to which feed is properly and continuously distributed from the interior of the feeder as it is consumed.

These basic objectives are realized by a feeder comprised of a floor structure having an elongated feed trough along at least one side thereof, a baffle wall extending lengthwise of the floor structure and angling downwardly and outwardly towards the feed trough, a horizontally extending feed accumulating floor segment located between the outer extremity of the baffle wall and the feed trough, and an upright side wall structure extending lengthwise of the feeder and having an open bottom portion located between the feed trough and the feed accumulating floor segment, the open bottom portion of the side wall structure being sized to accommodate the heads of livestock to thereby permit livestock to feed from the side trough as well as from the aforesaid feed accumulating floor segment.

The aforesaid open bottom portion of the side wall structure of the feeder is advantageously divided into a plurality of vertically extending, animal feeding spaces by a plurality of horizontally spaced, upright bar members located at the juncture of the feed trough and the feed accumulating floor segment. The vertically extending animal feeding spaces defined by the upright bar members at the open, bottom end of the side wall structure are located within larger feeding compartments formed along the length of the side feed trough by a plurality of upright, horizontally spaced divider plates extending transversely of the feed trough and terminating at their inner ends at the junction between the feed trough and the feed accumulating floor segment.

A further beneficial aspect of my invention resides in the construction of the feeder in the form of a wagon which may be quickly and easily assembled from floor and side wall subassemblies, and which includes a divider baffle assembly disposed centrally of the floor structure of the wagon and having a pair of oppositely inclined side walls angling downwardly and outwardly towards a pair of feed troughs extending along each side of the floor structure. In this preferred embodiment of the invention, a horizontally extending, feed accumulating floor segment is located on each side of the wagon between the outer extremity of one of the inclined baffle side walls and one of the feed troughs. Livestock feeding from the side troughs may project their heads through an open bottom portion of each of the side wall structures of the wagon to feed off the flat, feed accumulating floor segments, the feeding action of the livestock from the flat floor segments interiorly of the wagon serving to assist in the continuous, downward movement of fibrous feed, such as silage and hay, downwardly and outwardly towards the side feed troughs in cooperation with the guiding action of the divider baffle assembly.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a top, perspective view of the feeder of this invention;

FIG. 2 is a side elevation view of the feeder of FIG. 1; and

FIG. 3 is a vertical section view of the feeder taken along lines 3—3 of FIG. 2.

DESCRIPTION OF THE PREFERRED EMBODIMENT

Referring now to the drawings, I have shown in FIG. 1 a perspective view of a preferred embodiment of the livestock feeder of this invention. The feeder takes the form of an elongated, rectangular shaped receptacle or hopper having a main floor structure generally designated by reference numeral 1. Although desirable for field use, but not necessary, the feeder is constructed as a feed wagon having front and back wheels 2 and 4 mounted on front and rear axles upon which floor structure 1 is supported. Rear axle 6 is shown in FIG. 3. Extending lengthwise of the feeder are a pair of channel beams 8 and 10 which are affixed to the top of the wheel axles as by welding, and which serve as base support means for the floor structure 1. As may best be understood by reference to FIG. 3, a pair of channel shaped stringers 12 and 14 forming an integral part of side wall structures hereinafter described rest on top of channel beams 8 and 10 in conforming relation thereto. Bolts 13 are utilized to attach stringers 12 and 14 to channel beams 8 and 10. It is to be noted that channel beams 8 and 10 project forwardly and rearwardly of the front and rear axles to which they are attached, but do not extend the entire length of the feeder structure, as is indicated the fact that channel beams 8 and 10 do not appear in section in FIG. 3. To provide support surfaces for portions of both side wall and floor structures, channel shaped stringers 12 and 14 are formed to the particular shapes shown in FIG. 3 so as to include inner flange strips 12a, 14a and outer, inclined flange strips 12b, 14b.

The floor structure further includes a plurality of horizontally spaced, transversely extending floor beams or cross ties 16 of right angle shape which are secured to flange strips 12a, 14a by means of bolts 18. Transverse floor beams 16 are located at spaced apart positions along the length of the feeder structure. Removably resting on top of the floor beams 16 are a pair of elongated, horizontally extending floor panels 20 and 22 which serve as feed accumulating floor segments and as feeding surfaces in a manner hereinafter explained. At their inner edges, floor segments 20 and 22 are engaged and held in place by a pair of elongated, generally Z-shaped strips 24 and 26 having lower, horizontally oriented receiving openings 24a and 26a which receive and restrainably engage the spaced apart inner edges of floor segments 20 and 22. Z-strips 24 and 26 extend substantially the entire length of the feed wagon and are supported at spaced points along their lengths by floor beams 16.

At their upper ends, Z-strips 24 and 26 are formed to include angling hooked top sections 24b and 26b. The purpose of these hooked sections 24b and 26b is to provide restraining support for a divider baffle assembly disposed substantially centrally of the floor structure and having a pair of oppositely inclined side walls in the form of plates 28 and 30 which angle downwardly and outwardly from the apex which they form, in the manner shown in FIGS. 1 and 3. At their upper ends, baffle plates 28 and 30 rest against and are supported by the top of a plurality of upright posts 32 aligned along the length of floor structure 1 substantially at the center thereof. Support posts 32 are mounted on transverse floor beams 16, and supportably engage the top edges of baffle plates 28 and 30 at their upper ends. Either a weld joint, or a threaded fastening connection may be utilized to attach baffle support posts 32 to floor beams 16. In the embodiment illustrated in FIG. 3, the lower ends of support posts 32 are threaded, and are inserted through floor beams 16 for attachment thereto by means of nuts 34. Baffle plates 28 and 30 are held firmly in place against support posts 32 by an elongated channel cap 36 which rests on the top of baffle plates 28 and 30 in the manner illustrated in FIGS. 1 and 3. The upper, reduced diameter threaded ends 31 of support posts 32 extend through channel cap 36 and are tightly secured thereto by means of nuts 38, whereby the upper ends of baffle plates 28 and 30 are tightly secured between channel cap 36 and the upper ends of support posts 32.

It will be appreciated that the particular arrangement and use of Z-strips 24, 26 and upright support posts 32 provide a very simple and quick way to assemble the floor structure and divider baffle assembly. After Z-strips 24 and 26 are attached to floor beams 16, floor segments 20 and 22 are quickly put in place by simply sliding them into position along the top of floor beams 16, with their inner edges inserted within the lower, horizontally extending receiving openings 24a and 26a of strips 24 and 26. With upright support posts 32 attached to floor beams 16, removable baffle plates 28 and 30 are then placed in the inclined positions shown in FIG. 3 with their lower edges restrainably engaged by angled, upper sections 24b and 26b of Z-strips 24 and 26, and with their upper edges engaging the tops of support posts 32. Channel cap 36 is then positioned and tightened on top of baffle plates 28 and 30.

Extending along opposite sides of the feeder are a pair of substantially upright, side wall structures 40 and 42. These two side wall structures are of identical construction, and have an upper, solid wall portion 44 which includes a wall segment 44a which inclines upwardly and outwardly from the interior of the feeder. This wall structure arrangement increases the interior volume of the feeder by making it wider, and adds strength to the side wall assemblies. The lower, inner edges of upper side wall portions 44 are formed to provide inwardly projecting lips 44b which extend substantially over the entire length of the side wall structures. Lips 44b, in cooperation with channel stringers 12 and 14 located directly thereunder, define therebetween open, bottom portions of the side wall structure 40 and 42 which serve a purpose hereinafter explained. The side wall assemblies or structures 40 and 42 further include upright end plates 46 and 48 at each end of the feeder which are welded, or otherwise secured at their inner ends to channel stringers 12 and 14. Solid, upper wall portions 44 are secured between end plates 46 and 48, as by welding, utilizing angle iron strips 50 extending along their upper edges. Formed along the upright, inner edges of end plates 46 and 48 are channels 52 and 54 which serve to slidably receive removable door panels 56 and 57 at each end of the feeder. Cleaning or servicing of the interior of the feeder is easily accomplished by slidably removing one or both of the door panels 56 and 57.

Strength and rigidity is imparted to the entire feeder structure, and particularly to side wall structures 40 and 42, by tying these side wall assemblies together by a center tie bar 58 extending therebetween. Center tie bar 58 is bolted to weld plates 59, which are welded to aligned portions of upper side wall portions 44. Also, at each end of the feeder or feed wagon, tie bars 60 and 62 are bolted between the respective, aligned end plates 46 and 48.

The open bottom portions of side wall structures 40 and 42 are divided into a plurality of vertically oriented, animal feeding spaces defined by horizontally spaced, upright bar members 64. Bars 64 are affixed at their upper and lower ends, as by welding, to side wall lips 44b and to channel stringers 12 and 14, respectively. Located immediately outside of bars 64, along opposite sides of floor structure 1 are a pair of elongated feed troughs defined by inclined trough walls 66 and 68. Troughs walls 66 and 68 preferably take the form of removable, elongated panels, which may be made of wood, extending over substantially the entire length of the feeder. The side feed troughs 66 and 68 are divided into a plurality of feeding compartments by a plurality of upright, horizontally spaced divider plates or partitions 70 extending transversely thereof. Partitions 70 extend from the outer edges of side feed troughs 66 and 68 to inwardly disposed points along channel stringers 12 and 14. The upper edges of partitions 70 are angled to conform to the angle of inclination of inclined wall segments 44a of the upper side wall portions 44, and are assembled in abutting relation therewith. In this manner, inclined side wall portions 44a, which extend outwardly over the side feed troughs 66 and 68, are strengthened and reinforced by upright partitions 70. A pair of rounded, tubular bars 72 extend along the outer edges of each of the side feed troughs 66 and 68 and are welded to upright partitions 70. Extending between tubular bars 72 and channel stringers 12 and 14 are a plurality of horizontally spaced flat, metal bars 74, which serve as base, support elements for the side feed troughs 66 and 68. Metal bars 70 are preferably welded at their ends to tubular bar 72, and to inclined flange strips 12b and 14b of channel stringers 12 and 14, as most clearly appears in FIG. 3. Tubular bars 72 are formed along their inside surfaces to provide inwardly disposed, flattened upper edges 72a on which the outer edges of side trough panels 66 and 68 are slidably supported. Trough panels 66 and 68 are installed by simply sliding these wooden panel sections under the bottom edges of partitions 70 on top of metal bars or strips 74, with the opposed side edges of trough panels 66 and 68 being supported on the flattened, inner edges 72a of tubular bars 72 and on inclined flange strips 12b and 14b of channel stringers 12 and 14. End cross bars 76 and 78 mounted across the end extremities of floor structure 1, and extending outwardly over side feed troughs 66 and 68 in the manner shown in FIG. 1 serve to hold removable trough panels 66 and 68 in place under partitions 70.

In its preferred form as a feed wagon, the feeder structure preferably includes a tongue 80 at its forward end attached to a channel shaped draw bar member 82, which is secured to the front axle of the wagon. A hinge pin connector 84 is preferably used to attach tongue 80 to draw bar 82, as is illustrated in FIG. 1.

The feeder as described and disclosed herein is designed primarily for storing and distributing fibrous type of feed such as silage, baled hay, cubed hay, chopped hay and loose hay to cattle. Feed stored interiorly of the feed wagon between upright side wall structures 40 and 42 is continuously directed outwardly towards feed troughs 66 and 68 by inclined side walls or plates 28 and 30 of the divider baffle assembly. Partitions or divider plates 70 are spaced apart horizontally a sufficient distance to provide relatively large feed compartments along the length of side feed troughs 66 and 68, from which two or three cattle may feed at one time. Trough partitions 70 are of sufficient height and width to not only visually block feeding animals from each other, but also to serve as effective wind breaks to keep wind from blowing feed in troughs 66 and 68 lengthwise of the troughs. The spaces between upright bars 64 are of sufficient width and height as to permit an animal's head, particularly the heads of cattle, to be inserted therethrough. The distance between partitions 70 is greater than the width of the feeding spaces between adjacent bars 64, and preferably, the feeding compartments between adjacent partitions 70 are of a width equal to the width of at least two of the feeding spaces between adjacent bars 64. Thus, cattle can not only feed from external, side troughs 66 and 68, but may also insert their heads between bars 64 so as to be able to consume feed from the substantially flat, horizontal feed areas defined by floor segments 20 and 22. For this purpose, floor segments 20 and 22 are located between the outer extremities of inclined baffle walls 28 and 30 and feed troughs 66 and 68. Inclined baffle walls 28 and 30, being directed downwardly and outwardly towards feed troughs 66 and 68 and towards floor segments 20 and 22, will thus serve to guide feed into troughs 66 and 68, as well as onto floor segments 20 and 22 as feed is consumed by animals from both of these feeding zones.

Upright bars 64, being located along channel stringers 12 and 14 defining the juncture line between feed troughs 66, 68 and feed accumulating floor segments 20, 22 effectively serve, not only as part of the side wall structures separating the inside of the feeder from external troughs 66, 68, but also advantageously divide the lower, open portion of the side wall structures 40, 42 into a plurality of smaller feed spaces permitting limited access of the heads of cattle to the interior of the feeder, and to the feed accumulating on floor segments 20 and 22. This double feed zone arrangement utilizing side feed troughs 66, 68 as well as internal, feed accumulating floor segments 20, 22 not only provides additional areas on which feed may accumulate, and from which it may be conveniently consumed by animals, but also beneficially contributes to the desired, continuous distribution of feed from the upper portions of the feeder, downwardly along divider baffles 28 and 30 towards feed troughs 66 and 68. The latter benefit is realized by the feeding action which takes place inside of upright bars 64 from feed accumulating on floor segments 20 and 22. As animals feed from this internal feeding zone, they tend to work the feed downwardly from the upper zones of the feeder towards baffles 28, 30 and floor segments 20, 22. Thus, this feeding action within the main storage space of the feeder internally of side wall assemblies 40, 42 promotes the downward and outward movement of fibrous feeds, such as silage, baled hay, chopped hay, etc., which otherwise tends to hand-up and accumulate on upper, solid side wall portions 44.

Although I have shown and described my feeder in the form of a wagon having a centrally disposed baffle assembly directing feed towards floor feed segments and a pair of side feed troughs located on opposite sides of the feeder, I contemplate that the beneficial features of my feeder could be achieved utilizing only one side feed trough, and a single, inclined baffle located along one side of the feeder and inclined downwardly and outwardly towards the side-mounted feed trough. I anticipate that these and other changes and modifications may be made in the size, shape, and structural arrangement of my feeder without departing from the spirit and scope of my invention as defined by the following claims.

I claim:

1. A livestock feeder comprising:
    a floor structure terminating along its opposed sides at a pair of elongated feed troughs extending longitudinally of said floor structure, each of said feed troughs having a base wall for holding feed;
    a divider baffle assembly supported on said floor structure substantially centrally thereof and having a pair of oppositely inclined side walls extending longitudinally of said floor structure and angling downwardly and outwardly towards said pair of feed troughs from the apex of said baffle assembly, the outer, longitudinal bottom edges of said side walls terminating at said floor structure inwardly from the inner, longitudinal edges of said base walls of said troughs;
    a pair of horizontally extending feed accumulating segments of said floor structure located on each side thereof between said outer, bottom edges of said inclined side walls and said inner, longitudinal edges of said feed trough base walls; and
    a pair of substantially upright side wall structures supported on said floor structure and extending longitudinally of said feeder along opposite sides thereof, each of said side wall structures having an open bottom portion divided into a plurality of vertically extending animal feeding spaces defined by a plurality of horizontally spaced, upright rigid members forming a portion of said side wall structures with their bottom ends engaging said floor structure, said rigid members being located at the juncture line of said inner edges of said feed trough base walls and the outer, longitudinal edges of said feed accumulating floor segments, whereby livestock feeding from said troughs may project their heads through said open bottom portions of said side walls structures between said upright members to also consume feed from said feed accumulating floor segments.

2. A livestock feeder as defined in claim 1 wherein: said feed troughs are divided into a plurality of feed compartments by a plurality of upright, horizontally spaced divider plates which extend transversely of said feed troughs from the outer edges thereof to inwardly disposed points at the juncture lines of said feed troughs with said feed accumulating floor segments, said divider plates being horizontally spaced apart by a distance at least equal to two of said feeding spaces between adjacent ones of said upright bar members.

3. A livestock feeder as defined in claim 1 wherein: the inner edges of said feed accumulating floor segments are spaced apart from each other and are received and held within a pair of elongated, generally Z-shaped strips having lower receiving openings within which the inner edges of said feed accumulating floor segments are contained, and each of said Z-shaped strips having an upwardly angling top section which restrainably engages the bottom end of one of said oppositely inclined side walls of said baffle assembly.

4. A livestock feed wagon comprising:

a floor structure supported on axle and wheel assemblies and terminating along at least one side thereof at an elongated feed trough extending longitudinally of said floor structure, said feed trough having a base wall for holding feed;

a baffle wall supported on said floor structure and extending lengthwise thereof at a laterally spaced apart location from said feed trough and angling downwardly and outwardly towards said feed trough with the bottom edge of said baffle wall terminating at said floor structure laterally inwardly from the inner, longitudinal edge of said trough base wall;

a horizontally extending, feed accumulating floor segment of said floor structure located between said bottom edge of said baffle wall and the inner edge of said feed trough;

an upright side wall structure extending lengthwise of said feeder and having an open bottom portion located between said feed trough and said feed accumulating floor segment, whereby livestock feeding from said trough may project their heads through said open bottom portion of said side wall structure to also consume feed from said feed accumulating floor segment, said open bottom portion of said side wall structure being divided into a plurality of vertically extending, animal feeding spaces by a plurality of horizontally spaced, upright bar members located at the juncture line of said feed trough and said feed accumulating floor segment; and a plurality of upright, horizontally spaced divider plates extending transversely of said feed trough and separating said feed trough into a plurality of feed compartment, said divider plates terminating at their inner ends at the junction line between said feed trough and said feed accumulating floor segment, and said divider plates being horizontally spaced apart by a distance greater than the width of said feeding spaces between adjacent ones of said upright bar members.

* * * * *